United States Patent Office 3,314,507
Patented Apr. 18, 1967

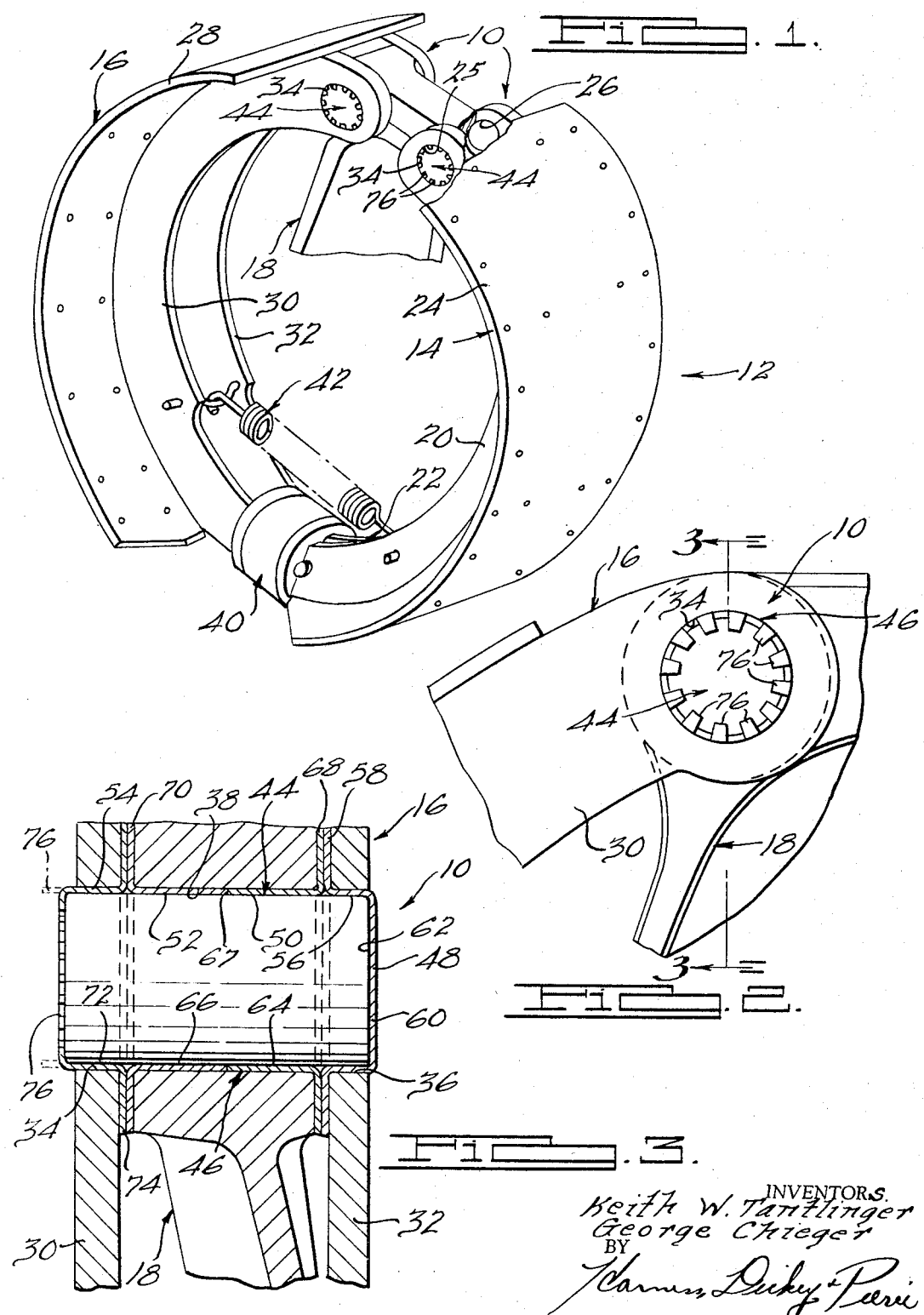

3,314,507
RETAINER PIN
Keith W. Tantlinger, Grosse Pointe Shores, and George Chieger, Birmingham, Mich., assignors to Fruehauf Corporation, Detroit, Mich., a corporation of Michigan
Filed Oct. 23, 1965, Ser. No. 503,488
4 Claims. (Cl. 188—78)

This invention relates generally to internally expanding brakes of the type used on automobiles, trucks, trailers, buses and the like. More particularly, the present invention relates to a novel retainer pin assembly for use in operatively mounting internally expanding brake shoes.

It has heretofore been the practice in the construction of internally expanding brake assemblies to movably secure one end of each of the brake shoes to its associated brake spider member by means of an anchor or retaining pin which extends parallel to the axis of rotation of the associated wheel and provides for pivotal movement of the one end of the brake shoe relative to the adjacent portion of the spider. It has frequently been the case, however, that such retainer pins become frozen in the pin bores of the spider within which they are mounted, due to road dirt, corrosion and the like. Such occurrences have been highly objectionable due to the fact that the brake spiders frequently become bent or similarly damaged when the frozen retainer pins are removed for purposes of changing brake shoe linings. This, of course, results in excessive component replacement along with relatively high accompanying labor costs. Additionally, the retainer pin bores in the brake shoes frequently become worn, making replacement of these parts necessary.

Generally speaking, the present invention relates to a new and improved retainer pin assembly that includes an annular bushing which is interposed between the outer periphery of the retainer pin and the inner periphery of the retainer pin bores formed in the brake shoe and associated brake spider member. The aforesaid bushing is preferably constructed of a corrosion resistant material and is thereby adapted to prevent the associated retainer pin from becoming frozen, thus obviating the above-described objectionable characteristics of heretofore known and used retaining pins.

It is accordingly a general object of the present invention to provide a new and improved retaining pin assembly for use in pivotably securing one end of an internally expanding brake shoe to its associated brake spider member.

It is another object of the present invention to provide a new and improved retaining pin assembly of the above character which is adapted to prevent freezeup of the associated retaining pins, bending of the brake spiders, wearing of the spider retainer pin bores and wearing of the brake shoe retaining pin bores.

It is still another object of the present invention to provide a new and improved retaining pin assembly of the above character which includes an annular bushing constructed of a corrosion resistant material and interposed between the outer periphery of the retaining pin and the inner periphery of the retaining bores in the brake shoe and associated brake spider member.

It is yet another object of the present invention to provide a new and improved retaining pin assembly of the above character wherein the retaining pin is positively secured within the bores formed in the brake shoes and brake spider member by means integrally formed on the bushing.

It is a further object of the present invention to provide a new and improved retainer pin assembly of the above character which is of an extremely simple design, easy to assemble and economical to manufacture.

It is yet a further object of the present invention to provide a new and improved retaining pin assembly of the above character which may be easily and quickly removed and be replaced without welding, reaming or drilling.

Other objects and advantages of the present invention will become apparent from the following detailed description taken in conjunction with the accompanying drawing, wherein:

FIGURE 1 is an elevated perspective view, partially broken away, of a portion of a brake assembly comprising a pair of expanding brake shoes and a brake spider, the brake shoes being secured at one end to the brake spider by retaining pin assemblies embodying the principles of the present invention;

FIG. 2 is an enlarged side elevational view of a portion of the structure illustrated in FIGURE 1; and FIG. 3 is an enlarged fragmentary cross sectional view taken along the line 3—3 of FIGURE 2.

Referring now the drawing, a retainer pin assembly 10 constructed in accordance with an exemplary embodiment of the present invention, is shown in operative associated with a portion of a conventional brake assembly 12 comprising a pair of arcuate brake shoes 14 and 16 and a central brake spider member 18. The brake shoe 14 includes web sections 20 and 22 and an arcuate lining support section 24, the web sections 20, 22 being formed with aligned retaining pin bores 25 and 26, respectively. In a similar manner, the brake shoe 16 includes a lining support section 28 and web sections 30 and 32 which are formed with aligned retaining pin bores 34 and 36, respectively. The radially outer end of the spider 18 is formed with a pair of spaced parallel retaining pin bores, generally designated 38 and one of which is illustrated in FIGURE 3. The ends of the brake shoes 14 and 16 within which the bores 24, 26, 34 and 36 are formed are adapted to be secured to the outer end of the spider member 18 by means of two retaining pin assemblies 10 of the present invention, one of which is illustrated in FIGURES 2 and 3 and will be hereinafter described in detail. The assemblies 10 are adapted to provide for pivotal movement of the brake shoes 14 and 16 about axes extending through the bores 38, which movement of the shoes 14, 16 is provided by a conventional piston assembly 40 and return spring 42 that are operatively secured to the lower ends of the brake shoes 14 and 16 and operate in a manner well known in the art.

Referring now in detail to the construction of the retaining pin assembly 10 of the present invention, as illustrated in FIGURES 2 and 3, the assembly 10 comprises a cylindrical uniform diameter retaining pin 44 which is slightly smaller in diameter than the bores 34, 36 and 38 and extends coaxially therethrough, whereby to pivotally connect the upper end of the brake shoe 16 to the spider member 18. Interposed between the outer periphery of the retaining pin 44 and the inner periphery of the bores 34, 36 and 38, is a cylindrical bushing, generally designated 46, that is preferably constructed of stainless steel or other suitable wear resistant and noncorrosive material and which is adapted to serve a twofold purpose of positively securing the retaining pin 44 in its operative position and preventing freezeup of the pin 44 within the bores 34, 36 and 38, as will be described.

As best seen in FIGURE 3, the bushing 46 comprises four component sections; namely, a cup-shaped base section 48, cylindrical central sections 50 and 52, and a retaining section 54. The base section 48 comprises a cylindrical side wall portion 56 that contiguously engages the outer periphery of the right end of the pin 44 and also the inner periphery of the bore 36 in the web section 32 of the brake shoe 16. The left end of the wall portion 56 is formed with a radially outwardly extending flange portion 58 which abuts against the axially inboard side of the web section 32. The opposite (right) end of the wall portion 56 is formed with a radially extending end portion 60 that bears against the right end of the pin 44 and which, together with the wall portion 56 defines an annular cup-shaped recess 62 that is adapted to nestingly receive the right end of the pin 44.

The central sections 50 and 52 of the bushing 46 comprise axially extending cylindrical wall portions 64 and 66, respectively, that contiguously engage the inner periphery of the bore 38 in the spider member 18 and also the outer periphery of the portion of the retaining pin 44 that is radially aligned with the bore 38. The right end of the bushing section 52 and the left end of the section 50 abut at a position substantially equidistant from the opposite ends of the bore 38, as seen at 67 in FIGURE 3. The right end of the section 50 is formed with a radially outwardly extending flange portion 68 which is of the same size as the flange portion 58 of the bushing section 56 and abuts against the flange portion 58 and the right side of the spider member 18 circumjacent the bore 18, as illustrated in FIGURE 3. In a similar manner, the left end of the bushing section 52 is formed with a radially outwardly extending flange portion 70 that is also of the same size as the portions 58 and 68 and which abuts against the left side of the spider member 18 circumjacent the bore 38.

The retaining section 54 of the bushing 46 comprises an annular wall portion 72 that contiguously engages the bore 34 in the web section 30 and outer periphery of the portion of the retaining pin 44 which is radially aligned with the bore 34. The right end of the section 54 is formed with a radially outwardly extending flange portion 74 that is identical to the above described flange portions 58, 68 and 70 and which abuts against the inboard side of the brake shoe's web section 30. The opposite (left) end of the bushing section 54 is formed with a plurality of circumferentially spaced tab portions, generally designated 76, which are adapted to be bent radially inwardly over the left end of the retaining pin 44 upon assembly of the pin 44, whereby to positively retain the pin 44 in its operative position illustrated in FIGURE 3.

Installation of the assembly 10 of the present invention is accomplished by initially inserting the bushing section 48 into the bore 36 until the flange portion 58 thereof engages the inboard side of the web section 32. Thereafter, the central sections 50 and 52 of the bushing 46 are inserted into the opposite ends of the bore 38 in the spider member 18 until the flange portions 68, 70 thereof, respectively, engage the opposite sides of the spider member 18. The retaining section 54 of the bushing 46 is then inserted into the bore 34 of the web section 30 until the flange portion 74 thereof engages the inboard side of section 30. It may be noted that the tab portions 76 of the bushing section 54 are initially in the position illustrated by the dotted lines in FIGURE 3 wherein they extend axially from the left end of the annular wall portion 72. After the various sections of the bushing 46 have been properly mounted within the web sections 30, 32 and spider member 18, these members are positioned such that the bores 34, 36 and 38 formed therein are axially aligned or register with one another, at which time the retaining pin 44 is inserted axially from the outboard side of the web section 30 through the bushing 46 until the right end of the pin 44 abuts against the left side of the end wall portion 60 of the bushing section 48, whereby the pin 44 is disposed in its operative position. At this time, the plurality of tab portions 76 may be bent or deformed radially inwardly from the position illustrated by the dotted lines in FIGURE 3 to the position indicated in FIGURE 2, thereby precluding any axial movement of the pin 44 relative to the bushing 46, web sections 30 and 32 or spider member 18.

It will be seen from the above description of the retaining pin assembly 10 of the present invention that the possibility of freezeup between the anchor pin 44 and the bores 34, 36 and 38 of the brake shoe web sections 30, 32 and the spider member 18 will be minimized to the extreme by virtue of the antifriction and noncorrosive characteristics of the bushing 46. More particularly, by virtue of the fact that the flange portions 58, 68, 70 and 74 of the bushing sections 48, 50, 52 and 54 extend radially outwardly and are tightly abutted against the adjacent confronting face portions of the brake shoe 16 and spider member 18, road dirt and the like will be precluded from penetrating between the inner periphery of the bores 34, 36 and 38, and the outer periphery of the retaining pin 44. Moreover, the flange portions 58, 68, 70 and 74 provide for substantially frictionless movement between the opposite sides of the spider member 18 and the inboard sides of the web sections 30 and 32 of the brake shoe 16, whereby to further minimize any resistance to pivotal movement of the brake shoe 16 relative to the spider member 18.

A particular feature of the present invention resides in the fact that there are no auxiliary fastening means required to maintain the retaining pin 44 in its operative position within the bores 34, 36 and 38. More particularly, by virtue of the fact that the retaining pin 44 is positively retained between the end wall portion 60 of the bushing section 48 and the tab portions 76 of the bushing section 54, it is not necessary to provide any locking rings, cotter keys or the like in the assembly 10, thereby materially reducing the component cost of the assembly 10. Another feature of the present invention resides in the fact that the assembly 10 is extremely easy to assemble and disassemble and therefore provides for rapid removal of the brake shoes 14 and 16 from the spider member 18 to facilitate brake lining replacement and the like.

While it will be apparent that the exemplary embodiment of the retaining pin assembly 10 of the present invention is well calculated to fulfill the objects above stated, it will be appreciated that the present invention is susceptible to modification, variation and change without departing from the proper scope or fair meaning of the subjoined claims.

What is claimed is:
1. In a brake assembly comprising an expanding brake shoe and brake spider member,
   a retaining pin assembly for pivotally securing one end of the brake shoe to a portion of the spider member,
   said pin assembly comprising a retaining pin extending through axially aligned bores in said one end of the brake shoe and in said portion of the spider member,
   an annular bushing coextensive of said retaining pin and interposed between the periphery of said pin and the periphery of said bores, and
   means integrally formed on said bushing and extending radially therefrom for preventing any axial movement of said retaining pin relative to the brake shoe and spider member and for reducing frictional forces resisting pivotal movement between the brake shoe and the spider member.

2. The invention as set forth in claim 1 wherein said means for preventing any axial movement of said retaining pin relative to the brake shoe and spider member comprises a plurality of circumferentially spaced radially inwardly extending tab portions integrally formed on one end of said bushing.

3. The invention as set forth in claim 1 wherein said means for reducing frictional forces resisting pivotal movement between the brake shoe and the spider member comprises a plurality of radially outwardly extending flange portions integrally formed on said bushing and interposed between the adjacent face portions of the brake shoe and spider member.

4. In a brake assembly comprising a spider and an expanding brake shoe, a retaining pin assembly for pivotably securing one end of said brake shoe to said spider, a retaining pin bore formed in said spider, a pair of web sections on said brake shoe, a pair of aligned retaining pin bores formed one in each of said web sections of said brake shoe and aligned with said bore in said spider, a cylindrical retaining pin extending coaxially through said aligned bores, and an antifriction bushing having substantially the same inner diameter as the diameter of said retaining pin and an outer diameter of substantially the same diameter as said bores, said bushing being constructed of a wear and corrosion resistant material and comprising a base section, a retaining section and a pair of central sections, said base section being mounted in said retaining bore in one of said web sections and comprising a radially extending end wall portion engageable with one end of said retaining pin and a radially outwardly extending flange portion engageable with the inboard side of the said web section, said central cylindrical sections of said bushing each comprising annular side wall portions engageable with the outer periphery of said retaining pin and radially outwardly extending flange portions engageable with the opposite sides of said spider, said retaining section of said bushing comprising an annular side wall section engageable with said bore in the other of said web sections and a radially outwardly extending flange portion engageable with the inboard side of said other web section, said retaining section further including a plurality of circumferentially spaced tab portions which are deformable from a position extending axially of said retaining pin to a position extending radially inwardly against one end of said retaining pin, whereby to preclude any axial movement of said retaining pin relative to said bushing, said flange portions of said central sections being engaged with said flange portions of said base section and said retaining section, whereby to reduce frictional forces resisting pivotal movement between said web sections and said spider member.

References Cited by the Examiner

UNITED STATES PATENTS 3,136,390  6/1964  Zukowski _____ 188—78

DUANE A. REGER, *Primary Examiner.*